(12) United States Patent
Uln (10) Patent No.: US 8,891,689 B2
(45) Date of Patent: Nov. 18, 2014

(54) DEMODULATING DATA STREAMS

(75) Inventor: Kiran Uln, Pleasanton, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 198 days.

(21) Appl. No.: 13/429,231

(22) Filed: Mar. 23, 2012

(65) Prior Publication Data

US 2013/0251074 A1    Sep. 26, 2013

(51) Int. Cl.
*H04L 27/06* (2006.01)
*H04L 27/38* (2006.01)
*H04L 1/00* (2006.01)
*H04L 25/02* (2006.01)

(52) U.S. Cl.
CPC .............. *H04L 27/38* (2013.01); *H04L 1/0054* (2013.01); *H04L 25/0258* (2013.01)
USPC .......................................... 375/340; 375/341

(58) Field of Classification Search
CPC ................. H04L 27/38; H04L 1/0054; H04L 2025/03624; H04L 25/0258; H04B 7/086
USPC ......... 375/316, 340, 341, 343, 346, 347, 229; 455/130, 269, 272, 278.1, 296, 312
See application file for complete search history.

(56) References Cited

U.S. PATENT DOCUMENTS

| | | | | |
|---|---|---|---|---|
| 6,151,487 | A * | 11/2000 | Kim et al. | 455/134 |
| 2002/0186779 | A1* | 12/2002 | Gollamudi | 375/267 |
| 2005/0175115 | A1* | 8/2005 | Walton et al. | 375/267 |
| 2008/0198941 | A1* | 8/2008 | Song et al. | 375/260 |
| 2009/0113429 | A1* | 4/2009 | Luschi et al. | 718/100 |
| 2010/0074376 | A1* | 3/2010 | Chen et al. | 375/340 |
| 2011/0069785 | A1* | 3/2011 | Ezri et al. | 375/316 |

OTHER PUBLICATIONS

Maurer et al., "Low-Complexity and Full Diversity MIMO Detection Based on Condition Number Thresholding", IEEE International Conference on Acoustics, Speech and Signal Processing, Apr. 2007, vol. 3, pp. III-61-III-64.*

* cited by examiner

*Primary Examiner* — Vineeta Panwalkar
(74) *Attorney, Agent, or Firm* — Sawyer Law Group, P.C.

(57) ABSTRACT

Embodiments for demodulating data streams are disclosed. In one embodiment, a method includes receiving, at a multiple-input device, a plurality of data streams. The method also includes determining a degree of correlation among the plurality of data streams. The method also includes selecting a demodulator based on the degree of correlation.

14 Claims, 6 Drawing Sheets

| OFDM / tone | 2 Streams | 3 Streams |
|---|---|---|
| BPSK | 4 | 4 |
| QPSK | 12 | 48 |
| 16-QAM | 24 | 96 |
| 64-QAM | 72 | 288 |

| OFDM / tone | 2 Streams | 3 Streams |
|---|---|---|
| BPSK | 2 | 3 |
| QPSK | 4 | 6 |
| 16-QAM | 6 | 9 |
| 64-QAM | 10 | 15 |

DEMODULATING DATA STREAMS

FIELD OF THE INVENTION

The present invention relates generally to WLAN receivers, and more particularly to demodulating data streams.

BACKGROUND

Transmitted data streams in a network are modulated before being sent by a transmitter and demodulated after being received by a receiver. There are various types of demodulators that can be utilized for multiple-input multiple-output (MIMO) channels. A typical demodulator that can be utilized for this function is a zero-forcing (ZF) demodulator. ZF demodulators are relatively simple, and do not require a significant amount of power. ZF demodulators, however, have some performance issues when utilized in a MIMO environment. A maximal likelihood demodulator (MLD) has better performance characteristics than a ZF demodulator. MLDs, however, are computationally intensive and therefore consume more power than alternative demodulators. The higher power consumption is undesired, especially in mobile devices such as mobile phones and notebook computers. Accordingly, from a power consumption perspective, ZF demodulators are preferred over MLDs. ZF demodulators, however, do not perform as well as MLDs.

Accordingly, what is desired is an improved method and system for demodulating data streams. The system and method should be easily implemented, cost effective, reliable, require less power consumption, and should be adaptable to existing communications systems. Embodiments described herein address such a need.

SUMMARY

A method, system, and computer readable medium for demodulating data streams are disclosed. In one aspect, a method includes receiving, at a multiple-input device, a plurality of data streams. The method also includes determining a degree of correlation among the plurality of data streams. The method also includes selecting a demodulator based on the degree of correlation.

In another embodiment, a system includes a processor, a plurality of demodulators, wherein at least two of the demodulators include a zero-forcing (ZF) demodulator and a maximal likelihood demodulator (MLD), and a storage device that stores one or more sequences of instructions which when executed by the processor cause the processor to: receive a plurality of data streams; determine a degree of correlation among the plurality of data streams; and select either the ZF demodulator or the MLD based on the degree of correlation.

In another embodiment, a computer-readable medium includes program instructions. The program instructions which when executed by a computer system cause the computer system to execute a method comprising: receiving a plurality of data streams; determining a degree of correlation among the plurality of data streams; and selecting a demodulator based on the degree of correlation.

DETAILED DESCRIPTION

The present invention relates generally to WLAN receivers, and more particularly to demodulating data streams. The following description is presented to enable one of ordinary skill in the art to make and use embodiments of the invention, and is provided in the context of a patent application and its requirements. Various modifications to the embodiments and the generic principles and features described herein will be readily apparent to those skilled in the art. Thus, embodiments of the present invention are not intended to be limited to the examples shown, but are to be accorded the widest scope consistent with the principles and features described herein.

Embodiments provide a robust and efficient method and system for demodulating transmitted data streams in a network environment. More specifically, embodiments include a method and system for selecting the best demodulator to demodulate data streams based on varying requirements. Embodiments described herein may apply to any network environment including wireless communication systems, such as wireless local area network (WLAN) systems based on IEEE 802.11 standards (e.g., 802.11n, 11ac, etc.). As described in more detail below, a method for demodulating data streams includes receiving data streams at a receiver of a multiple-input and multiple-output (MIMO) device. The method also includes determining a degree of correlation among the data streams. The method also includes selecting a demodulator based on the degree of correlation. For example, if there is a low correlation among data streams, the MIMO device selects a ZF demodulator to demodulate the data streams. If there is a high correlation among data streams, the MIMO device selects an MLD to demodulate the data streams.

As a result, embodiments achieve both low-power consumption and optimal performance when demodulating multiple streams of data transmitted simultaneously over a MIMO channel. To more particularly describe the features of the present invention, refer now to the following description in conjunction with the accompanying figures.

Figure 1:
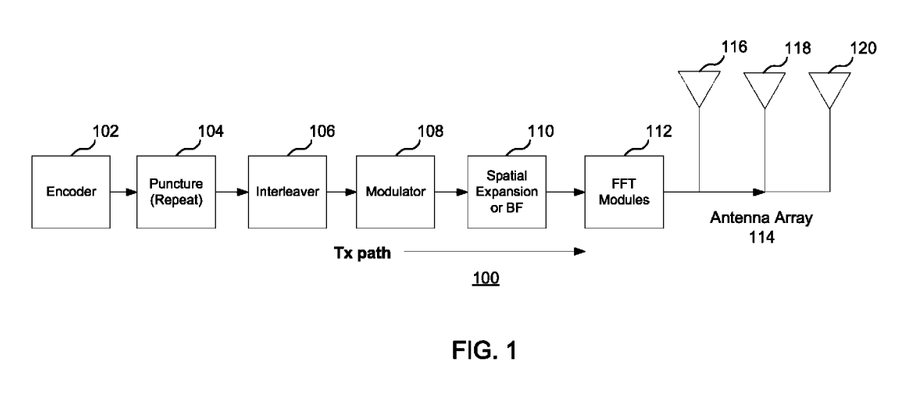
FIG. 1 is a block diagram of a transmitter circuit in accordance with an embodiment of the present invention.

FIG. 1 is a block diagram of a transmitter circuit 100 in accordance with an embodiment of the present invention. As shown, the transmitter circuit 100 provides a transmit (Tx) path, and the transmitter circuit 100 includes an encoder 102 that encodes a signal. In one embodiment, the encoder 102 is coupled to a puncture (repeat) module 104. The puncture module 104 is coupled to an interleaver 106. The interleaver 106 is coupled to a modulator 108. The modulator 108 is coupled to a spatial expansion or band filter (BF) 110. The band filter (BF) 110 is coupled to fast Fourier Transform (FFT) modules 112. In one embodiment, the FFT modules are tone (i) FFT (iFFT) modules. The FFT modules 112 are coupled to a multiple-input multiple-output (MIMO) antenna array 114. The MIMO antenna array 114 includes antennas 116, 118, and 120. The antennas 116, 118, and 120 of the MIMO antenna array 114 transmit multiple data streams (e.g., to the receiver circuit 200, which is described in more detail below in connection with FIG. 2).

Figure 2:
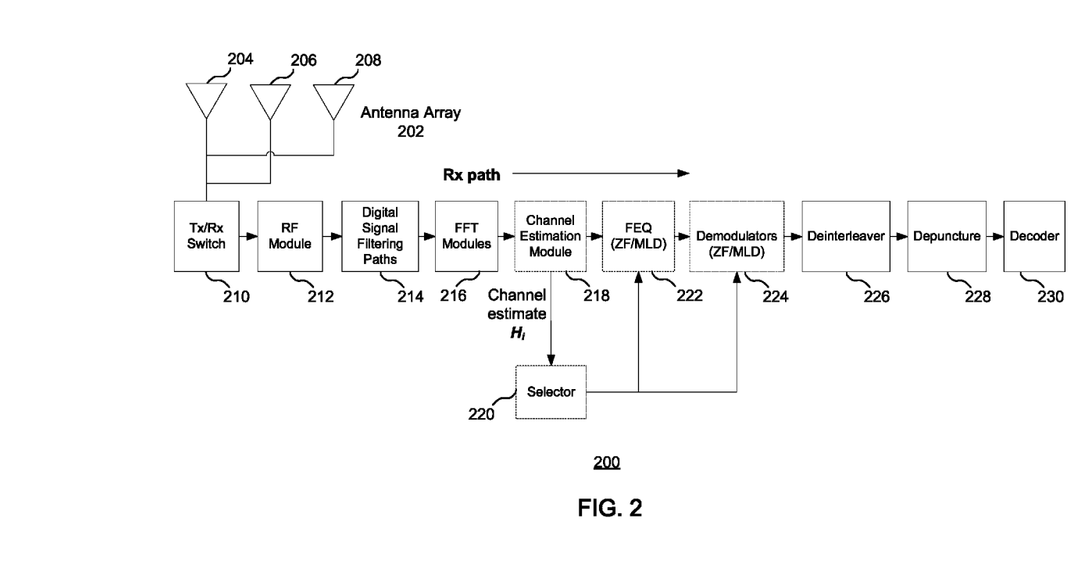
FIG. 2 is a block diagram of a receiver circuit in accordance with an embodiment of the present invention.

FIG. 2 is a block diagram of a receiver circuit 200 in accordance with an embodiment of the present invention. As shown, the receiver circuit 200 provides a receive (Rx) path, and the receiver circuit 200 includes a MIMO antenna array 202. MIMO antenna array 202 includes antennas 204, 206, and 208, which receive multiple data streams (e.g., from the transmitter circuit 100 of FIG. 1).

In one embodiment, the MIMO antenna array 202 is coupled to a transmit/receive (Tx/Rx) switch 210. The Tx/Rx switch 210 is coupled to a radio frequency (RF) module 212. In one embodiment, the RF module 212 is a MIMO RF module 212. The RF module 212 is coupled to digital signal filtering paths 214. The digital signal filtering paths 214 are coupled to FFT modules 216. The FFT modules 216 are coupled to a channel estimation module 218. The channel estimation module 218 is coupled to a selector 220, which selects a type of frequency domain equalizer (FEQ) and selects a demodulator for tones in the data streams. A method for selecting a demodulator is described in more detail below in connection with FIG. 3.

In one embodiment, the selector 220 is coupled to an FEQ 222 and to demodulators 224. The channel estimation module 218 is coupled to the FEQ 222. The FEQ 222 is coupled to the demodulators 224. In one embodiment, the FEQ 222 selects between processes associated with a ZF demodulator and processes associated with an MLD.

In one embodiment, the demodulators 224 include a zero-forcing (ZF) demodulator and a maximum likelihood demodulator (MLD). As described in more detail below, both the ZF demodulator and the MLD are implemented such that the receiver circuit 200 may dynamically switch back and forth between the ZF demodulator and the MLD as needed in order to maximize performance while minimizing power consumption.

The demodulators 224 are coupled to a deinterleaver 226. The deinterleaver 226 is coupled to a depuncture module 228. The depuncture module 228 is coupled to an error correction decoder 230, which decodes the signal.

In other embodiments, each of the transmitter circuit 100 and the receiver circuit 200 may not have all of the components shown and/or may have other elements including other types of elements instead of, or in addition to, those shown herein.

Figure 3:
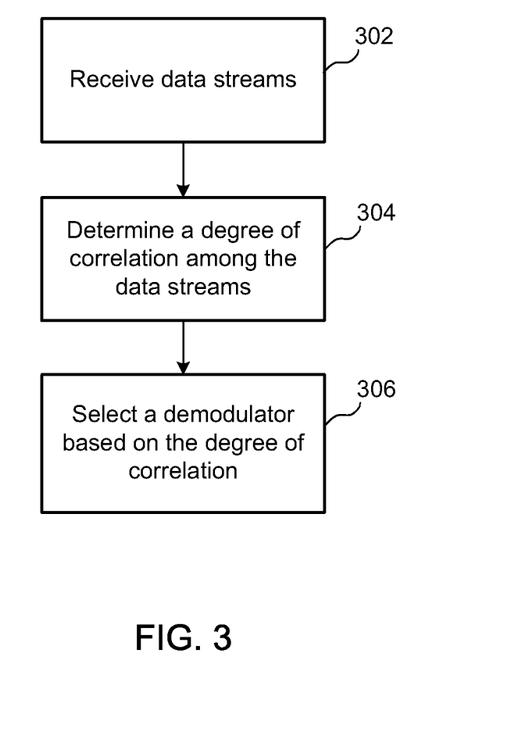
FIG. 3 is a flow chart which illustrates a method for demodulating data streams in accordance with an embodiment of the present invention.

FIG. 3 is a flow chart which illustrates a method for demodulating data streams in accordance with an embodiment of the present invention. Referring to FIGS. 2 and 3 together, first, the receiver circuit 200 receives data streams, via step 302. In various embodiments, the receiver circuit 200 may be a part of any MIMO device. Next, the receiver circuit 200 determines a degree of correlation among the data streams, via step 304.

Next, the receiver circuit 200 selects a demodulator based on the degree of correlation, via step 306. In one embodiment, the receiver circuit 200 selects the MLD if the degree of correlation is above a predefined threshold. In one embodiment, a fixed-complexity sphere decoder (FSD) may be used to implement the MLD. In one embodiment, the selecting of the demodulator comprises selecting an FSD if the degree of correlation is above a predefined threshold. In one embodiment, the receiver circuit 200 selects the ZF demodulator if the degree of correlation is below a predefined threshold. In various embodiments, the receiver circuit 200 switches between the MLD and the ZF demodulator adaptively and dynamically. The step of determining a degree of correlation among the plurality of data streams (step 304), and the step of selecting a demodulator based on the degree of correlation (306) are described in more detail below.

In various embodiments, the quality of a given set of channels is defined by the strength of the individual channels and by the coupling or correlation among the channels. In one embodiment, if the strength of the channels is high, the overall quality is good. If the correlation among the channels is also high, the overall quality of the channels may be low if an ZF demodulator is used. In such a scenario (e.g., high correlation), improved performance may be achieved by using an MLD to demodulate the data streams. In one embodiment, a fixed-complexity sphere decoder (FSD) may be used to implement the MLD.

In one embodiment, if the strength of the channels is high, and if the correlation among the channels is also low, the overall quality may be high and the performance of the MLD and the ZF demodulator will be similar. Accordingly, the MLD, which is power hungry, is not needed, and selecting the ZF demodulator would achieve quality with lower power consumption.

Figure 4:
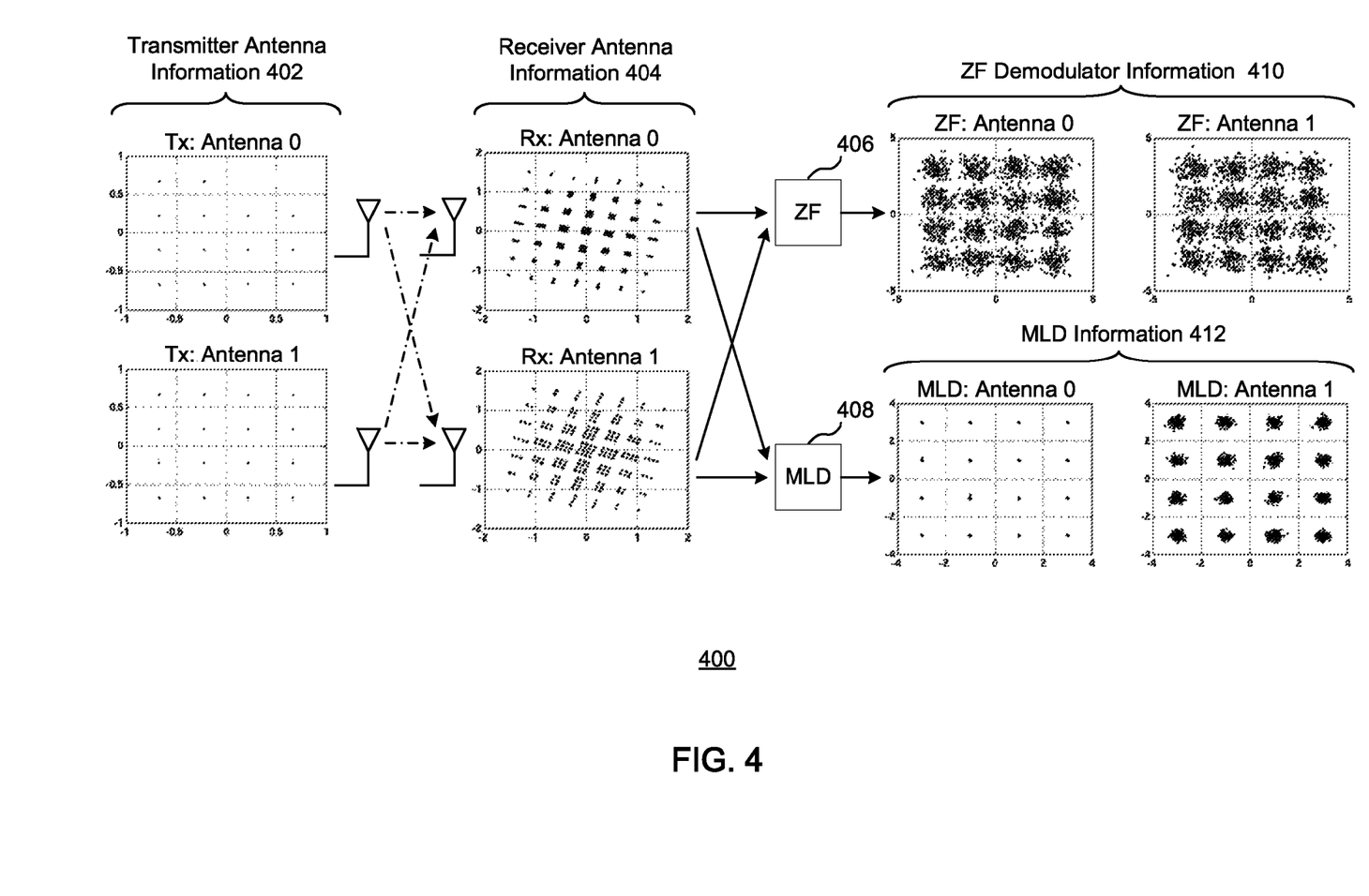
FIG. 4 is a diagram which illustrates a comparison between using maximal likelihood demodulator (MLD) and a zero-forcing (ZF) demodulator in the context of high cross correlation in accordance with an embodiment of the present invention.

FIG. 4 is a diagram 400 which illustrates a comparison between using an MLD and a ZF demodulator in the context of high cross correlation in accordance with an embodiment of the present invention. The diagram 400 shows transmitter antenna information 402 associated with transmitter antennas (e.g., antenna array 114 of FIG. 1) and receiver antenna information 404 associated with receiver antennas (e.g., antenna array 202 of FIG. 2). The transmitter antenna information 402 and 404 describe data streams when sent from the transmitter antennas to the receiver antennas.

If signal strength (SNR) is good, as shown in the diagram 400, all of the dots are clearly distinguishable. As FIG. 4 shows, even though the constellation of dots are clearly visible on the receive side, the two receivers (MLD and ZF demodulator) perform very differently.

The diagram 400 also shows a ZF demodulator (ZF) 406 and an MLD 408, which may be used to implement the demodulators 224 of FIG. 2. The diagram 400 also shows ZF demodulator information 410 associated with a ZF demodulator (e.g., ZF demodulator in demodulators 224 of FIG. 2) and MLD information 412 associated with an MLD (e.g., MLD in demodulators 224 of FIG. 2).

As shown, when the correlation is high, the MLD antenna 0 is very good, and the MLD antenna 1 is good, as there is no noise enhancement. The decision digits are all non-linear but they are optimal. The process of the MLD is a non-linear process, which involves many searches/computations, which is a power hungry process. As shown, the ZF demodulator has noise on both data streams, because of noise enhancement.

As shown, when the correlation is high, in the ZF demodulator information 410 the ZF demodulator has noise enhancement due to bad condition numbers of the channel matrix H. In one embodiment, if the ZF demodulator is selected, the ZF demodulator performs a channel inversion and divides or slices the constellation points.

Figure 5:
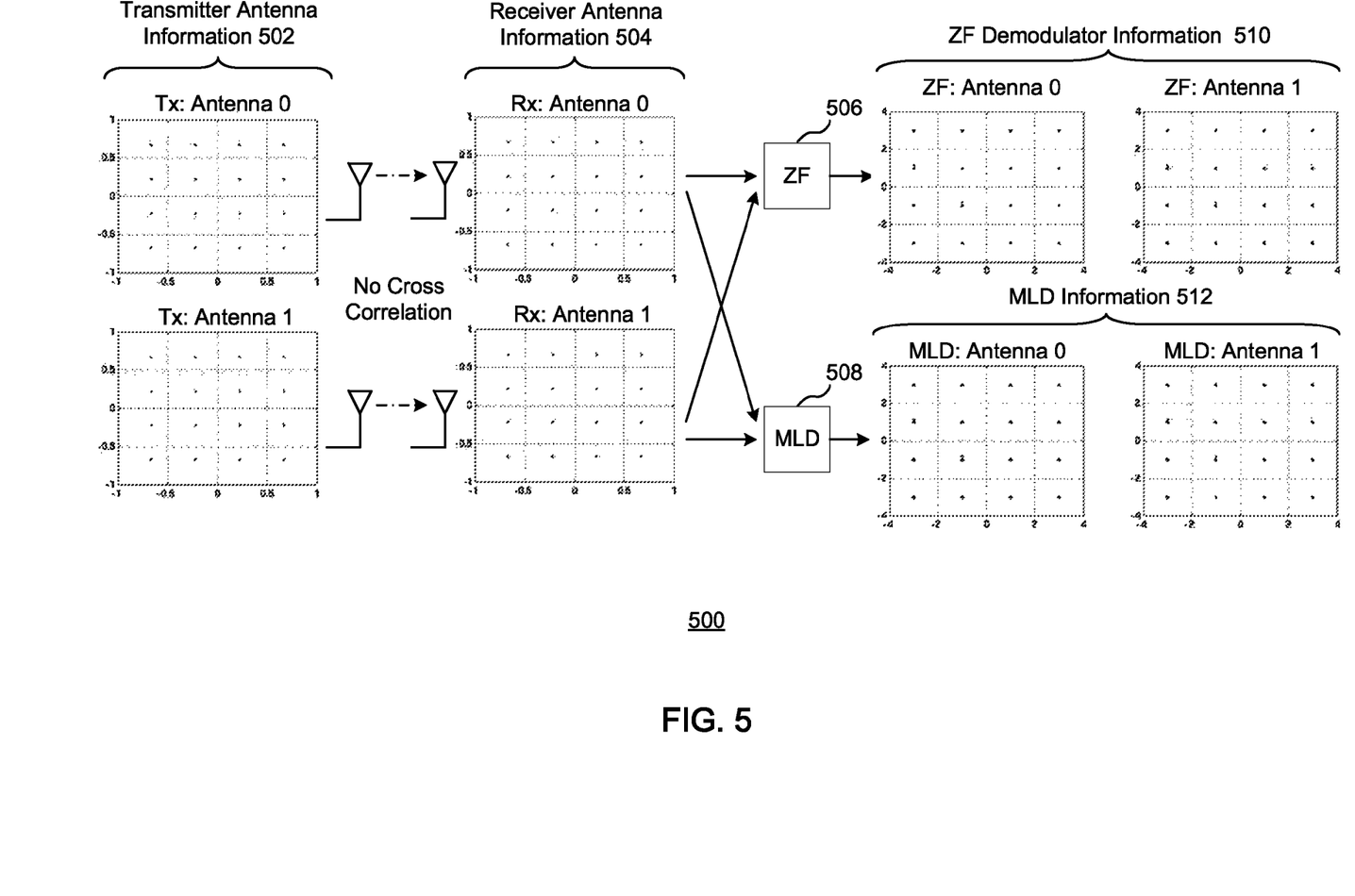
FIG. 5 is a diagram which illustrates a comparison between using an MLD and a ZF demodulator in the context of low or no cross correlation in accordance with an embodiment of the present invention.

FIG. 5 is a diagram 500 which illustrates a comparison between using an MLD and a ZF demodulator in the context of low or no cross correlation in accordance with an embodiment of the present invention. The diagram 500 shows transmitter antenna information 502 associated with transmitter antennas (e.g., antenna array 114 of FIG. 1) and receiver antenna information 504 associated with receiver antennas (e.g., antenna array 202 of FIG. 2). The transmitter antenna information 502 and 504 describe data streams when sent from the transmitter antennas to the receiver antennas.

If signal strength (SNR) is good, as shown in the diagram 500, all of the dots are clearly distinguishable. As FIG. 5 shows, the constellation of dots are clearly visible on the receive side, and the two receivers (MLD and ZF demodulator) perform similarly.

The diagram 500 also shows a ZF demodulator (ZF) 506 and an MLD 508, which may be used to implement the demodulators 224 of FIG. 2. The diagram 500 also shows ZF demodulator information 510 associated with a ZF demodulator (e.g., ZF demodulator in demodulators 224 of FIG. 2) and MLD information 512 associated with an MLD (e.g., MLD in demodulators 224 of FIG. 2).

As shown, where there is no cross correlation (or when the cross correlation is low), in the MLD and ZF demodulator information 512, the MLD provides optimal non-linear decision regions, but, the ZF demodulator is very close in performance and does not result in any loss of sensitivity.

Figure 6:
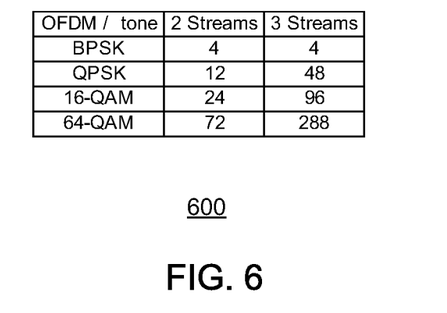
FIG. 6 is a diagram of a table which illustrates power consumption data associated with an MLD in accordance with an embodiment of the present invention.

FIG. 6 is a diagram of a table 600 which illustrates power consumption data, in terms of number of search operations performed, associated with an MLD in accordance with an embodiment of the present invention.

In one embodiment, the MLD computes HP=QR, where H is the channel matrix, P is a permutation matrix, Q is a unitary matrix, and R is an upper diagonal matrix. In one embodiment, the lower diagonal is all zeros. In one embodiment, to compute HP-QR, the receiver circuit 200 performs QR decomposition on the received data streams (e.g., on the channel matrix H).

In one embodiment, the MLD then performs a tree search. As FIG. 6 shows, the number of searches may vary and depend on the specific implementation. In various embodiments, every orthogonal frequency-division multiplexing (OFDM) tone will depend on the modulation and the number of streams. For example, as the table 500 shows, the range may be as low as 4 searches for binary phase-shift keying (BPSK) and may be as high as 288 in the 64-quadrature amplitude modulation (QAM) scenario.

Figure 7:
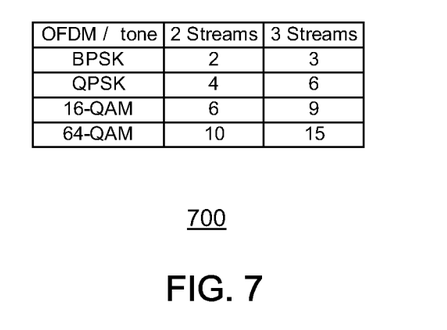
FIG. 7 is a diagram of a table which illustrates power consumption data associated with a ZF demodulator in accordance with an embodiment of the present invention.

FIG. 7 is a diagram of a table 700 which illustrates power consumption data associated with a ZF demodulator in accordance with an embodiment of the present invention. In one embodiment, the ZF demodulator computes the inverse matrix (H+) and performs demapping (e.g., slicing) in order to show the location of the constellation points. In one embodiment, the inverse H+ may be derived from the QR decomposition performed in the MLD branch. H+ may also be derived independently from the channel matrix H.

As FIG. 7 shows, the number of searches may vary and depend on the specific implementation. In various embodiments, every OFDM tone will depend on the modulation and the number of streams. For example, as the table 700 shows, the range may be as low as 2 searches for binary phase-shift keying (BPSK) and may be as high as 15 in the 64-quadrature amplitude modulation (QAM), which is significantly lower than the number of searches performed by the MLD in the same scenario.

The following is an example description of QR decomposition involving 2 data streams, where d0 is the strength of a first channel, d1 is the strength of a second channel, and r01 is a cross correlation between the first channel and the second channel. In one embodiment, if d0 and d1 are sufficiently strong, and r01 is also strong, the receiver circuit 200 selects the MLD, because the first and second channels are highly correlated.

However, if r01 is small, then the noise enhancement from the ZF demodulator would be very small. Because the ZF demodulator and the MLD would be very close in performance in this scenario, there would be little benefit in using the MLD for the extra searches. For example, if the MLD were to perform 200 searches but 185 of the searches were not useful, only 15 of the searches would be needed. Accordingly, the receiver circuit 200 would select the ZF demodulator. There is very little difference between the non-linear decision boundaries of MLD and the linear slicing boundaries of ZF. Accordingly, the choice of a ZF demodulator does not affect performance.

Examples of good channels where r01 is small may include a cable test, where R01 is almost 0. In another example, a system which has BeamForming enabled will attempt to keep r01 small. In one scenario where r01 is small, the receiver circuit 200 would select the ZF demodulator. In another scenario where r01 is large, the receiver circuit 200 would select the MLD. In various embodiments, both the ZF demodulator and the MLD are implemented, and the receiver circuit 200 switches back and forth between the ZF demodulator and the MLC adaptively (e.g., as needed, depending on the correlation) and/or dynamically (e.g., in real-time).

In various embodiments, performance of the receiver circuit 200 is not compromised by switching between the MLD and the ZF demodulator. In practice, there will be low correlation among data streams, and, thus, the ZF demodulator will be selected most of the time (e.g., 80% of the time). In such scenarios, the performance of the ZF demodulator will be similar to that of the MLD. Accordingly, much power will be saved. In the other scenarios, where there is a high correlation among data streams, the MLD will be selected (e.g., 20% of the time). In such scenarios, the MLD will ensure high performance of the receiver circuit 200.

In one embodiment, the receiver circuit 200 performs QR decomposition to select between the MLD and the ZF demodulation, where Q is an orthogonal matrix and R is an upper triangular matrix. In one embodiment, the receiver circuit 200 thresholds the cross correlation terms relative to a main diagonal entry. In one embodiment, QR decomposition is more resource intensive than performing a matrix channel inversion (H+), and the requirement for two data streams (2ss) is similar to the requirement for three data streams (3ss). The difference is negligible.

In one embodiment, the receiver circuit 200 performs QR decomposition once for an entire packet in a data stream.

In one embodiment, the receiver circuit 200 determines a log likelihood ratio (LLR) associated with the MLD, and determines a LLR associated with the ZF demodulator. In one embodiment, the LLR indicates the quality of a given bit in a data stream. For example, if a given bit is between 0 and 1, the LLR would be between 0 and 1. In one embodiment, if the LLR is closer to 0, there is a high confidence that the bit is 0. Conversely, if the LLR is closer to 1, there is a high confidence that the bit is 1. If the LLR is closer to 0.5, it is uncertain whether the bit is a 0 or a 1, which means that the quality of the bit is low.

The receiver circuit 200 ensures that the LLR associated with the MLD and LLR associated with the ZF demodulator substantially match. Accordingly, whether the receiver circuit 200 selects the MLD or the ZF demodulator, the LLR will reliably indicate the quality of bits in the data streams.

In one embodiment, the selecting of the demodulator includes determining if beamforming is being used by the MIMO device to filter the plurality of received data streams. If beamforming is used, there would be no need to use an MLD to achieve optimal performance. Accordingly, the receiver circuit will select a ZF demodulator if beamforming is being used. In one embodiment, if beamforming is used but is not performing adequately, the receiver circuit will select the MLD, if the correlation among the data streams is high.

Embodiments disclosed herein provide numerous benefits. For example, implementations of the embodiments described herein minimize power consumption and maximize performance.

A method and system for selecting a demodulator have been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RAN).

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method comprising:
   receiving, at a multiple-input device, a plurality of data streams;
   determining a degree of correlation among the plurality of data streams; and
   selecting a demodulator based on the degree of correlation, wherein the selecting of the demodulator comprises determining if beamforming is being used to filter the plurality of received data streams; and selecting a zero-forcing (ZF) demodulator if beamforming is being used.

2. The method of claim 1, wherein the selecting of the demodulator comprises performing QR decomposition on the received plurality of data streams.

3. The method of claim 1, further comprising:
   determining a first log likelihood ratio (LLR) associated with a maximal likelihood demodulator (MLD);
   determining a second LLR associated with the zero-forcing (ZF) demodulator; and
   ensuring that the first LLR and second LLR substantially match.

4. The method of claim 1, wherein the selecting of the demodulator comprises selecting a fixed-complexity sphere decoder (FSD) if the degree of correlation is above a predefined threshold.

5. A system comprising:
   a processor;
   a plurality of demodulators, wherein at least two of the demodulators include a zero-forcing (ZF) demodulator and a maximal likelihood demodulator (MLD); and
   a storage device storing one or more sequences of instructions which when executed by the processor cause the processor to:
   receive a plurality of data streams;
   determine a degree of correlation among the plurality of data streams; and
   select either the ZF demodulator or the MLD based on the degree of correlation;
   determine if beamforming is being used to filter the plurality of received data streams; and
   select the ZF demodulator if beamforming is being used.

6. The system of claim 5, wherein the instructions further cause the processor to perform QR decomposition on the received plurality of data streams.

7. The system of claim 5, wherein the instructions further cause the processor to:
   determine a first log likelihood ratio (LLR) associated with the MLD;
   determine a second LLR associated with the zero-forcing (ZF) demodulator; and
   ensure that the first LLR and second LLR substantially match.

8. The system of claim 5, wherein the instructions further cause the processor to select a fixed-complexity sphere decoder (FSD) if the degree of correlation is above a predefined threshold.

9. A non transitory computer-readable medium including program instructions, the program instructions which when executed by a computer system cause the computer system to execute a method comprising:
   receiving a plurality of data streams;
   determining a degree of correlation among the plurality of data streams; and
   selecting a demodulator based on the degree of correlation, the selecting a demodulator further comprising determining if beamforming is being used to filter the plurality of received data streams; and selecting a zero-forcing (ZF) demodulator if beamforming is being used.

10. The non transitory computer-readable medium of claim 9, further comprising program instructions for performing QR decomposition on the received plurality of data streams.

11. The non transitory computer-readable medium of claim 9, further comprising program instructions for:
   determining a first log likelihood ratio (LLR) associated with a maximal likelihood demodulator (MLD);
   determining a second LLR associated with the zero-forcing (ZF) demodulator; and
   ensuring that the first LLR and second LLR substantially match.

12. A method comprising:
    receiving, at a multiple-input device, a plurality of data streams;
    determining a degree of correlation among the plurality of data streams;
    selecting a demodulator based on the degree of correlation;
    determining a first log likelihood ratio (LLR) associated with a maximal likelihood demodulator (MLD);
    determining a second LLR associated with a zero-forcing (ZF) demodulator; and
    ensuring that the first LLR and second LLR substantially match.

13. A system comprising:
    a processor;
    a plurality of demodulators, wherein at least two of the demodulators include a zero-forcing (ZF) demodulator and a maximal likelihood demodulator (MLD); and
    a storage device storing one or more sequences of instructions which when executed by the processor cause the processor to:
    receive a plurality of data streams;
    determine a degree of correlation among the plurality of data streams; and
    select either the ZF demodulator or the MLD based on the degree of correlation, wherein the instructions further cause the processor to:
    determine a first log likelihood ratio (LLR) associated with the MLD;
    determine a second LLR associated with the zero-forcing (ZF) demodulator; and
    ensure that the first LLR and second LLR substantially match.

14. A non transitory computer-readable medium including program instructions, the program instructions which when executed by a computer system cause the computer system to execute a method comprising:
    receiving a plurality of data streams;
    determining a degree of correlation among the plurality of data streams;
    selecting a demodulator based on the degree of correlation;
    determining a first log likelihood ratio (LLR) associated with a maximal likelihood demodulator (MLD);
    determining a second LLR associated with a zero-forcing (ZF) demodulator; and
    ensuring that the first LLR and second LLR substantially match.

* * * * *